(12) United States Patent
Trupiano

(10) Patent No.: US 9,421,848 B2
(45) Date of Patent: Aug. 23, 2016

(54) QUICK-RELEASE WINDSHIELD SYSTEM

(71) Applicant: John Trupiano, Easton, PA (US)

(72) Inventor: John Trupiano, Easton, PA (US)

( * ) Notice: Subject to any disclaimer, the term of this patent is extended or adjusted under 35 U.S.C. 154(b) by 0 days.

(21) Appl. No.: 14/855,526

(22) Filed: Sep. 16, 2015

(65) Prior Publication Data

US 2016/0075217 A1 Mar. 17, 2016

Related U.S. Application Data

(60) Provisional application No. 62/050,933, filed on Sep. 16, 2014.

(51) Int. Cl.
*B60J 1/02* (2006.01)
*B60J 1/00* (2006.01)

(52) U.S. Cl.
CPC *B60J 1/006* (2013.01); *B60J 1/007* (2013.01); *B60J 1/02* (2013.01)

(58) Field of Classification Search
CPC .............. B60J 1/006; B60J 1/02; B60J 10/02; B60J 1/007
USPC .............. 296/93, 96.21, 96.22; 156/108, 168; 52/208
See application file for complete search history.

(56) References Cited

U.S. PATENT DOCUMENTS

| 4,581,276 | A * | 4/1986 | Kunert | B29C 47/0019 156/108 |
| 4,876,132 | A * | 10/1989 | Kunert | B29C 47/0014 156/108 |
| 4,933,032 | A * | 6/1990 | Kunert | B29C 47/003 156/108 |
| 6,000,746 | A * | 12/1999 | Ito | B60J 1/10 296/146.15 |
| 6,196,615 | B1 * | 3/2001 | Yada | B60J 10/0071 296/93 |
| 6,227,598 | B1 * | 5/2001 | Ichioka | B60R 13/04 296/93 |
| 2004/0212216 | A1 * | 10/2004 | Kagawa | B60J 10/02 296/146.15 |
| 2005/0006922 | A1 * | 1/2005 | Mikkaichi | B60J 10/0005 296/93 |
| 2005/0200163 | A1 * | 9/2005 | Arnold, Jr. | B60J 1/02 296/201 |
| 2012/0126566 | A1 * | 5/2012 | Jones | B60J 1/02 296/90 |

* cited by examiner

*Primary Examiner* — Jason S Morrow

(57) ABSTRACT

A quick-release windshield system is a system that allows the rapid and safe removal of a windshield panel from a windshield frame from the exterior of a vehicle. A release wire is releasably attached onto a seat rim of the windshield frame and may be pulled in order to cut through an adhesive that secures the windshield panel to the seat rim. A first end of the release wire is fixed to the windshield frame while a second end of the release wire is externally located to the windshield frame and may be accessed from the exterior of the vehicle. The release wire may be attached to the seat rim via a plurality of retaining fasteners or adhesively. The release wire is separated from the seat rim and may cut through the adhesive when the release wire is pulled from the exterior of the vehicle.

16 Claims, 15 Drawing Sheets

DETAIL B

SECTION C-C

DETAIL D

DETAIL F

QUICK-RELEASE WINDSHIELD SYSTEM

The current application claims a priority to the U.S. Provisional patent application Ser. No. 62/050,933 filed on Sep. 16, 2014.

FIELD OF THE INVENTION

The present invention relates generally to system for removing a vehicle windshield. More specifically, the present invention is a quick-release windshield system that allows the removal of a windshield from the vehicle exterior.

BACKGROUND OF THE INVENTION

The removal of a vehicle windshield can often be a time-consuming and challenging task. While this is not particularly problematic in routine windshield removals, the difficulties of removing a windshield can have life-threatening consequences when it is necessary to remove a windshield in an emergency situation. Emergency services personnel are often tasked with rescuing the occupants of a vehicle involved in a traffic collision. If the vehicle doors are rendered inoperable due to damage, personnel are required to remove the windshield in order to rescue the vehicle occupants. However, there is generally no means of both rapidly and safely removing the windshield. Even in non-emergency scenarios, windshield removal is often difficult due to the confined spaces within a vehicle. Additionally, careless or improper removal of a windshield can result in damage to the vehicle interior.

A vehicle windshield is typically mounted by perimetrically cementing the windshield to a recessed flange within a windshield frame. A curable urethane adhesive is then applied in between the base of the windshield perimeter and the horizontal surface of the flange in contact with the windshield. A flexible molding is then mounted around the windshield in order to cover the joint formed between the edge of the windshield and the vertical surface of the flange. A sealer may then be applied between the inner edge of the flange and the underside of the windshield. The present invention provides a means of cutting through the urethane adhesive that secures the windshield to the flange from the vehicle exterior. This allows the windshield to be quickly removed from the vehicle exterior without delay and without causing damage to the vehicle interior.

DETAIL DESCRIPTIONS OF THE INVENTION

All illustrations of the drawings are for the purpose of describing selected versions of the present invention and are not intended to limit the scope of the present invention.

Figure 1:
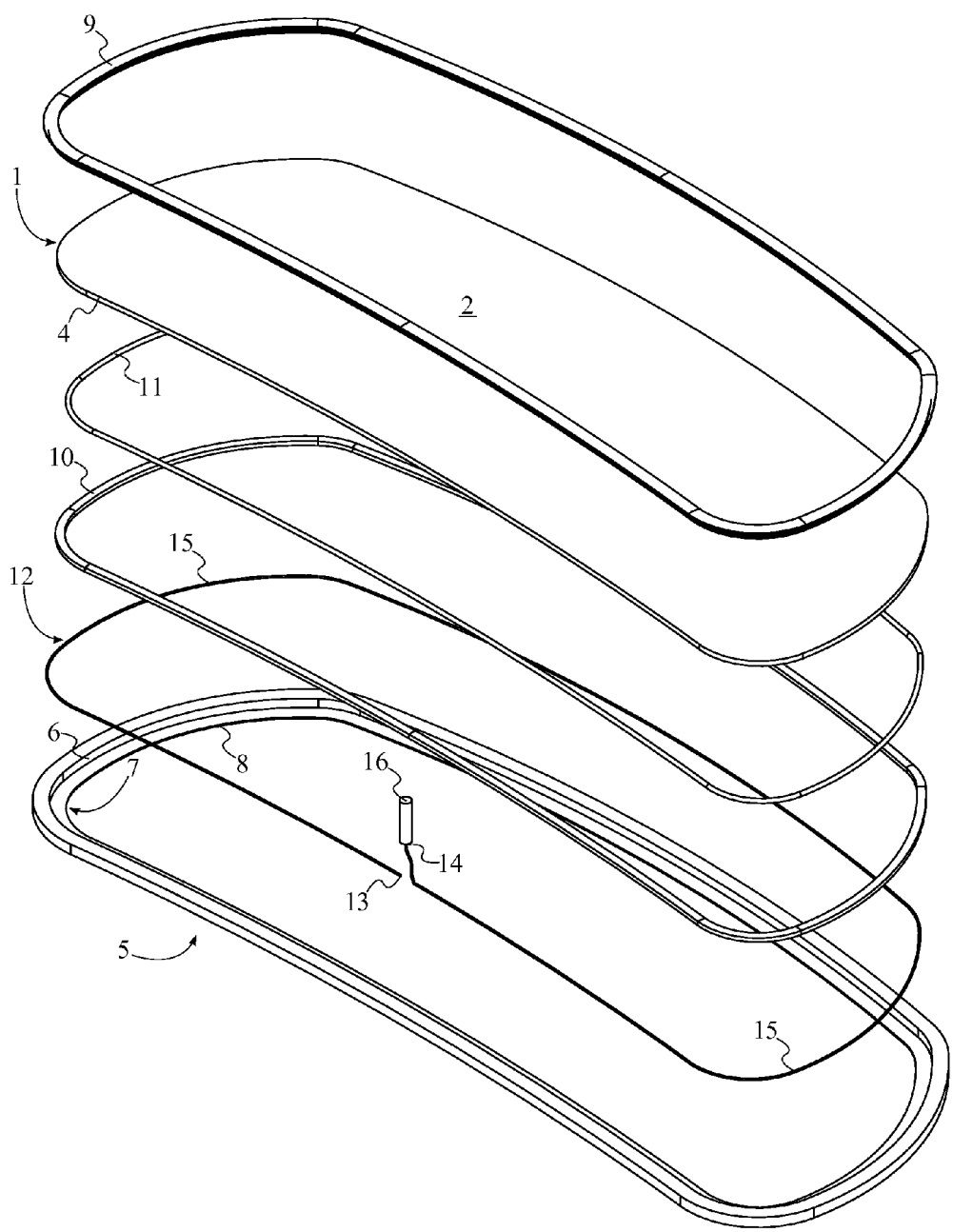
FIG. 1 is an exploded top perspective view of the present invention.
Figure 2:
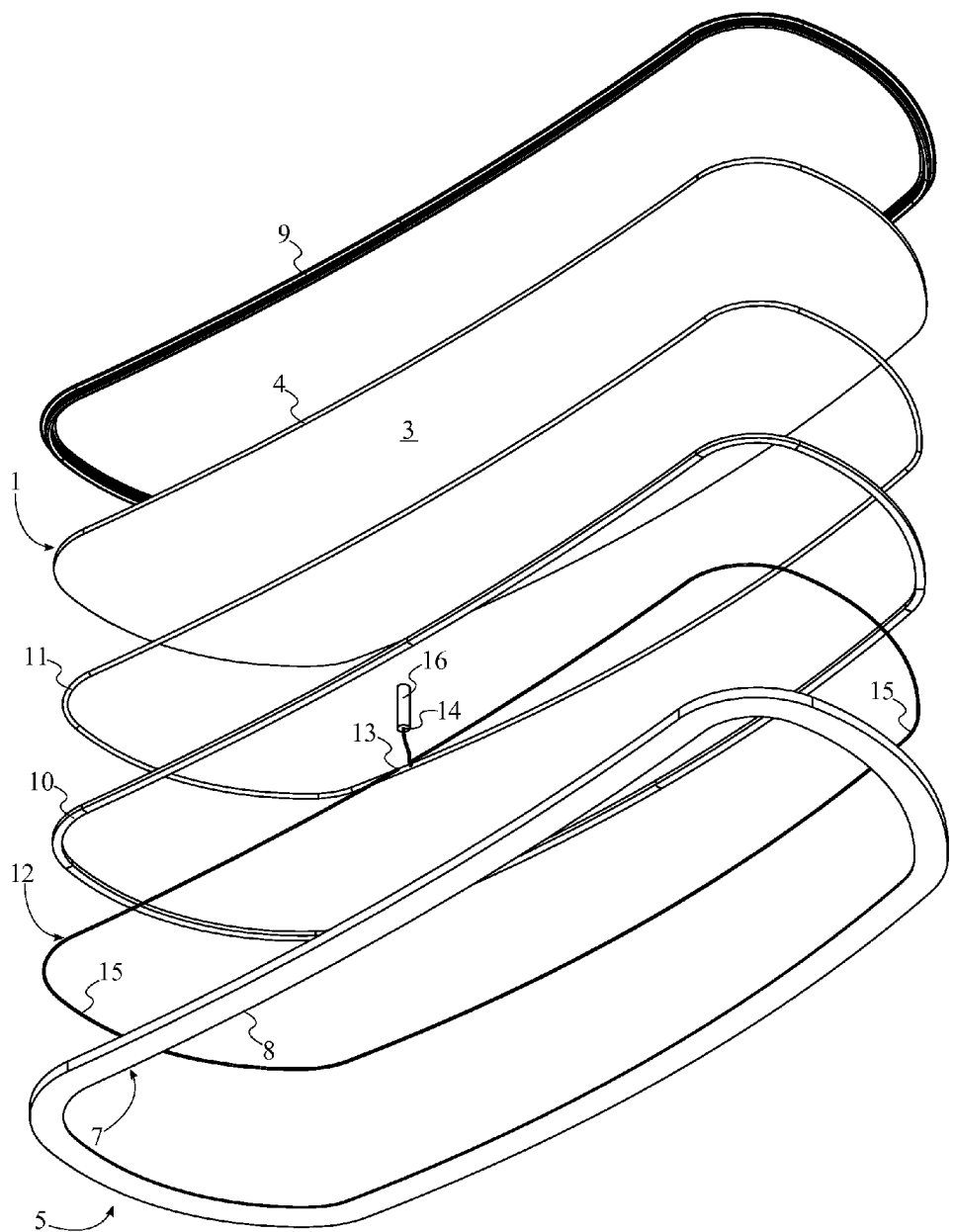
FIG. 2 is an exploded bottom perspective view of the present invention.
Figure 3:
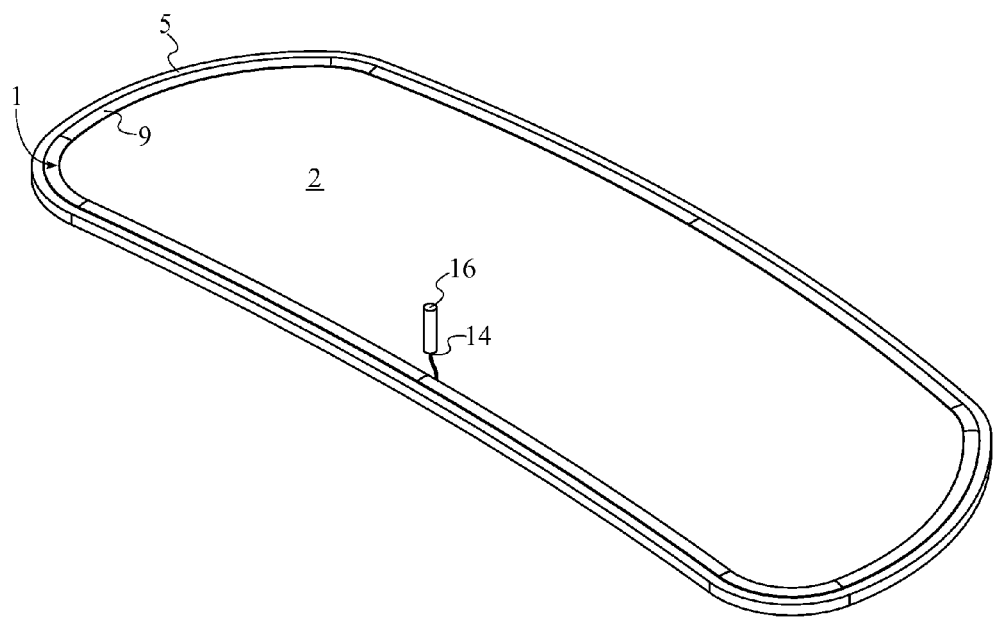
FIG. 3 is a perspective view of the present invention.

The present invention is a quick-release windshield system that allows a vehicle windshield to be rapidly removed from the vehicle exterior. The present invention is shown in FIGS. 1-3 and comprises a windshield panel 1, a windshield frame 5, a molding 9, an adhesive 10, a sealer 11, and a release wire 12.

The windshield panel 1 is the sheet of glass that allows vision of the vehicle's surroundings from within the vehicle. The windshield panel 1 comprises an exterior surface 2, an interior surface 3, and a lateral surface 4. The exterior surface 2 is the surface of the windshield panel 1 that is oriented toward the exterior of the vehicle when the windshield panel 1 is mounted into the windshield frame 5. Conversely, the interior surface 3 is the surface of the windshield panel 1 that is oriented toward the interior of the vehicle. The lateral surface 4 is the outward-facing surface of the windshield panel 1 in between the exterior surface 2 and the interior surface 3.

Figure 4:
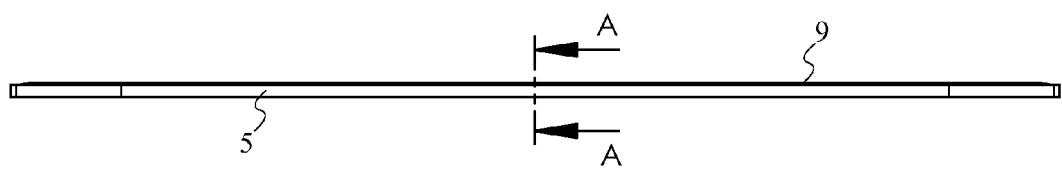
FIG. 4 is a front view of the present invention.
Figure 5:
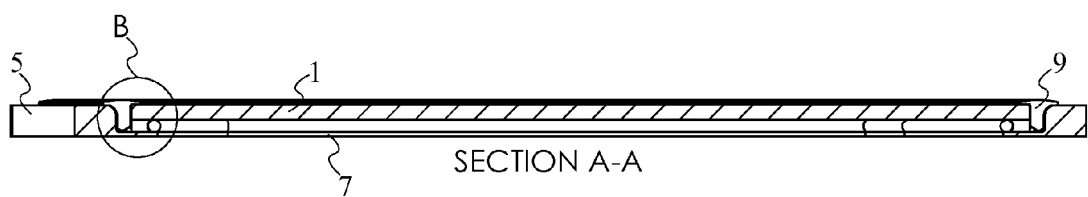
FIG. 5 is a cross-sectional view of the present invention taken along line A-A of FIG. 4.
Figure 6:
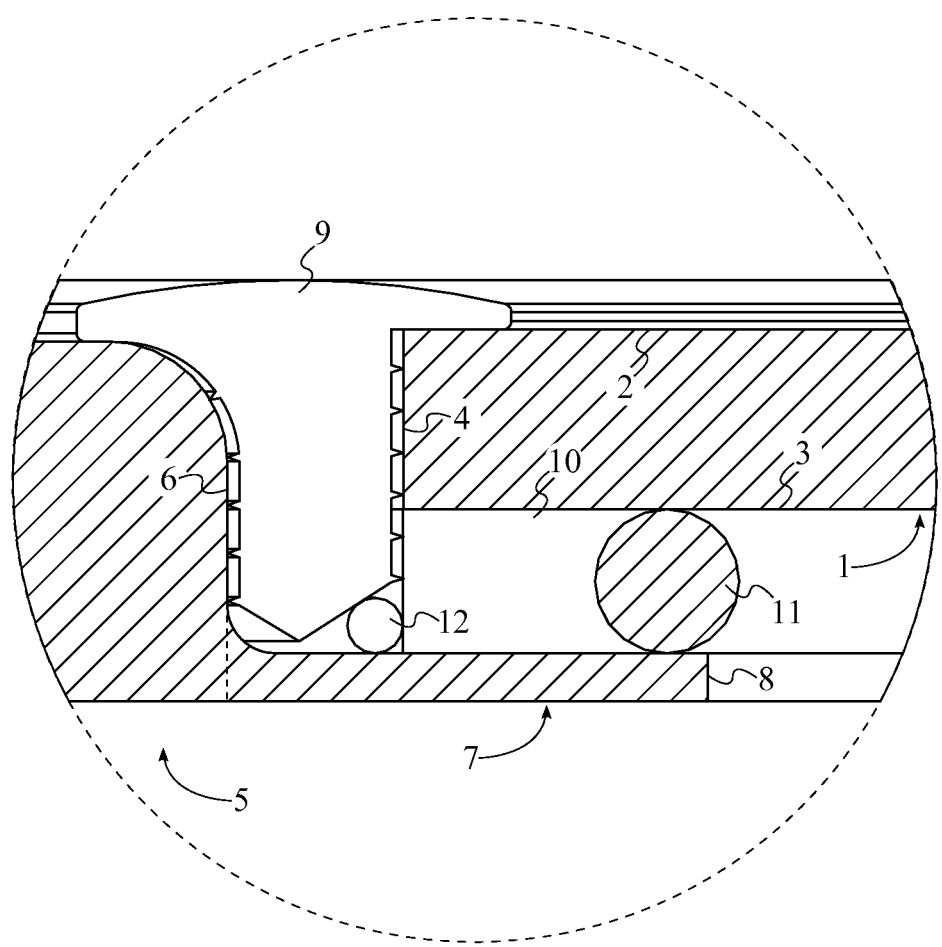
FIG. 6 is a detail view of the present invention taken from circle B of FIG. 5.

With reference to FIGS. 4-6, the windshield frame 5 is the frame into which the windshield panel 1 is mounted and provides structural support to the windshield panel 1. The molding 9, the adhesive 10, and the sealer 11 are utilized to secure the windshield panel 1 in place within the windshield frame 5 and additionally ensure that air and liquids are unable to pass from the exterior environment into the vehicle interior through any gaps between the windshield panel 1 and the windshield frame 5. As shown in FIG. 6, a cross-section of the windshield frame 5 comprises a lateral brace 6 and a seat rim 7. The lateral brace 6 is the surface of the windshield frame 5 from which the seat rim 7 extends. The seat rim 7 is positioned perpendicular to the lateral brace 6. In the preferred embodiment of the present invention, the seat rim 7 is a pinchweld onto which the windshield frame 5 may be mounted. The interior surface 3 is perimetrically adhered to the seat rim 7 by the adhesive 10 in order to secure the windshield frame 5 to the seat rim 7 and to prevent leaks of air and liquids from penetrating the vehicle interior. The adhesive 10 is preferably a urethane adhesive that provides flexibility for expansion and contraction. The lateral surface 4 is hermetically connected to the lateral brace 6 by the molding 9 as well. The molding 9 is able to fill the gap in between the lateral brace 6 and the lateral surface 4 in order to further ensure that air and liquids are unable to penetrate the vehicle interior. Finally, the sealer 11 is pressed against the interior surface 3 by the seat rim 7, to prevent air and liquid leakage. The sealer is preferably a waterproof and durable material such as silicone. The adhesive 10 is positioned in between the molding 9 and the sealer 11, allowing the sealer 11 to hold the adhesive 10 in place.

Figure 7:
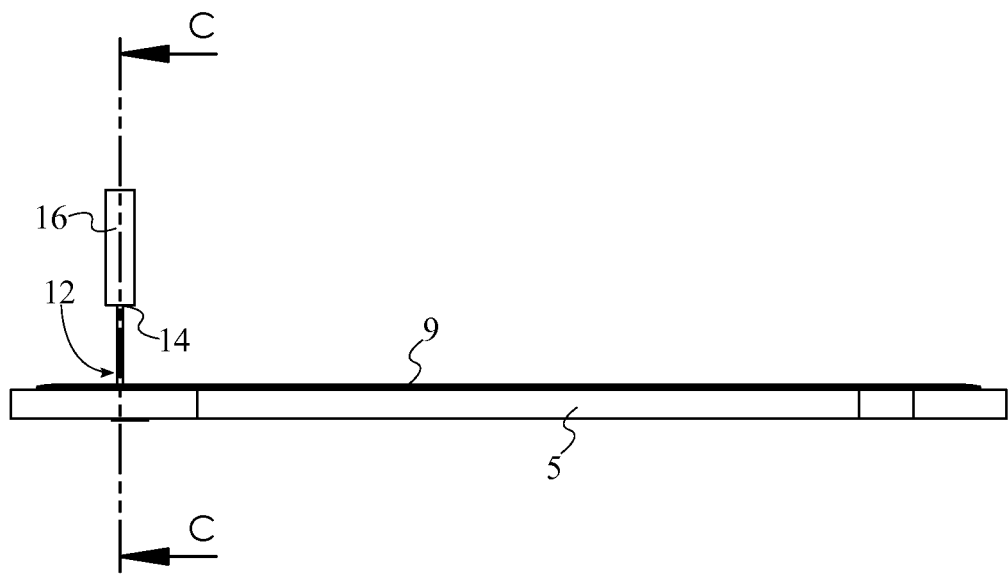
FIG. 7 is a side view of the present invention.
Figure 8:
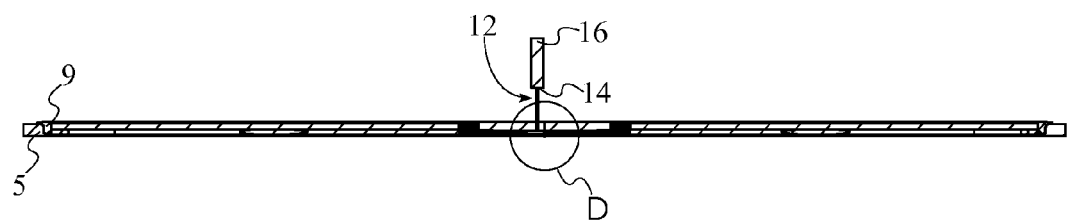
FIG. 8 is a cross-sectional view of the present invention taken along line C-C of FIG. 7.
Figure 9:
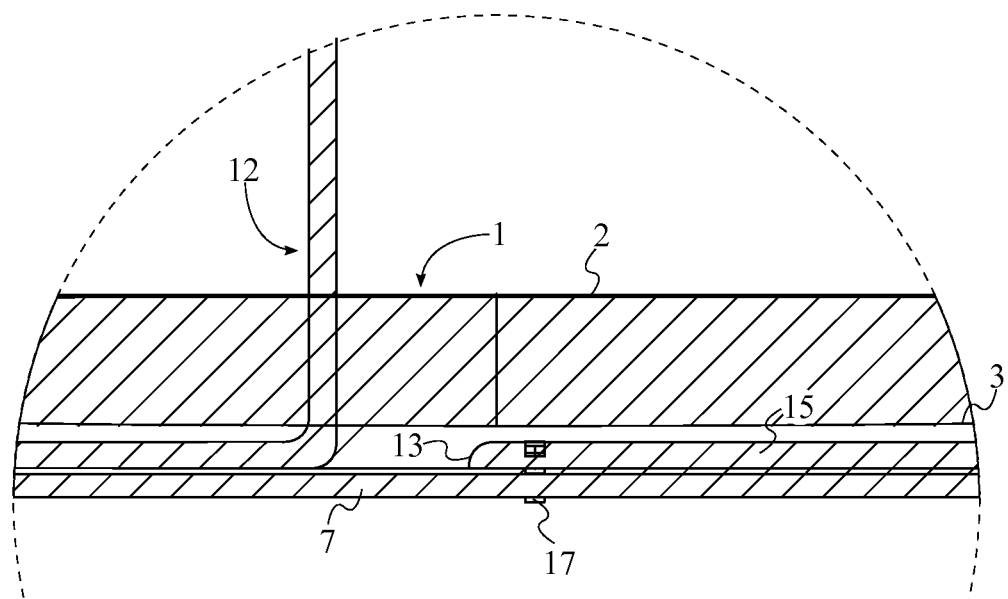
FIG. 9 is a detail view of the present invention taken from circle D of FIG. 8.
Figure 10:
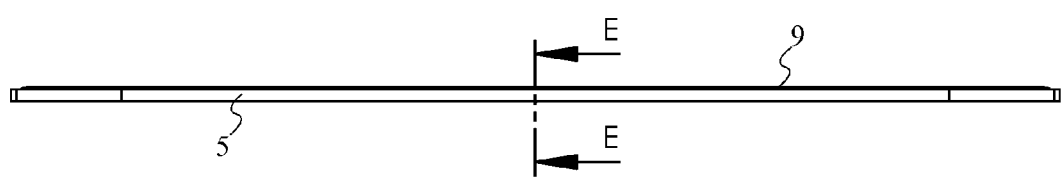
FIG. 10 is a front view of the embodiment of the present invention with the plurality of retaining fasteners.
Figure 11:
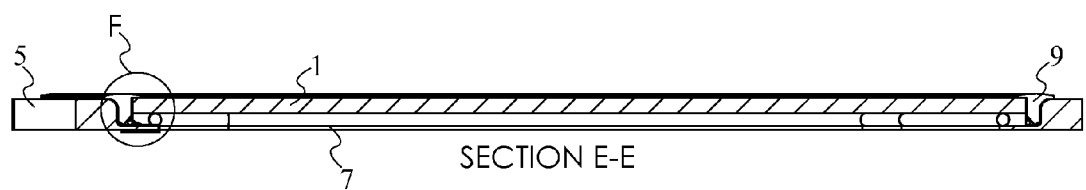
FIG. 11 is a cross-sectional view of the embodiment of the present invention with the plurality of retaining fasteners taken along line E-E of FIG. 10.
Figure 12:
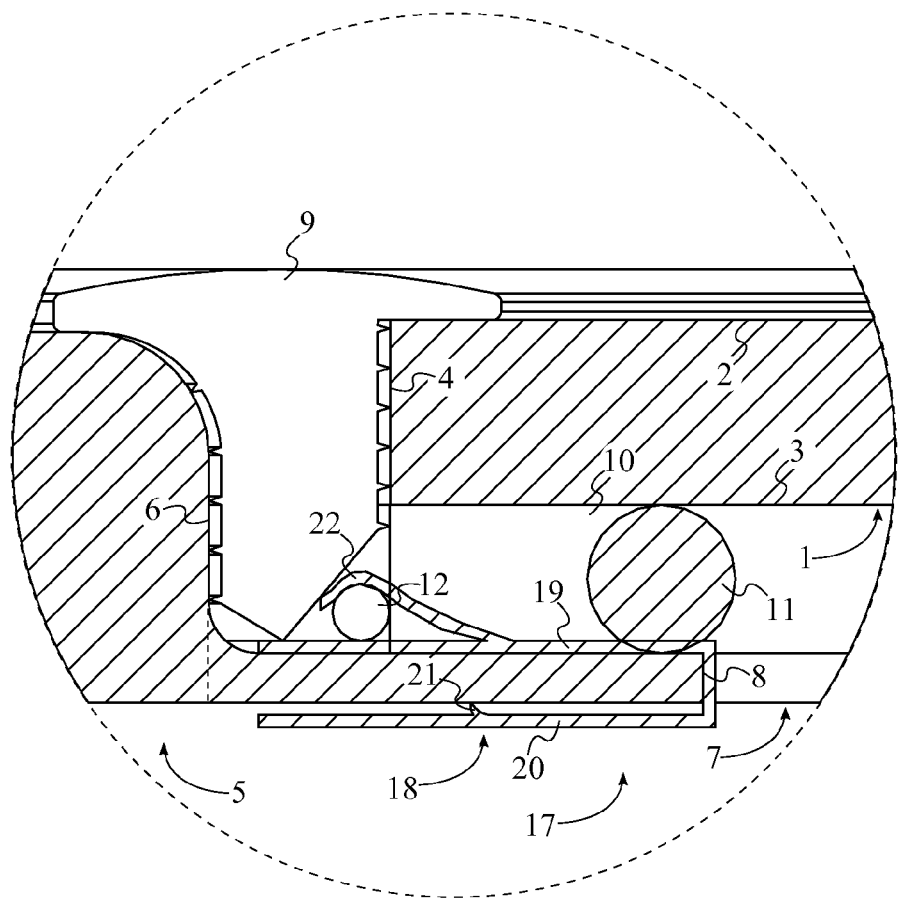
FIG. 12 is a detail view of the embodiment of the present invention with the plurality of retaining fasteners taken from circle F of FIG. 11.
Figure 13:
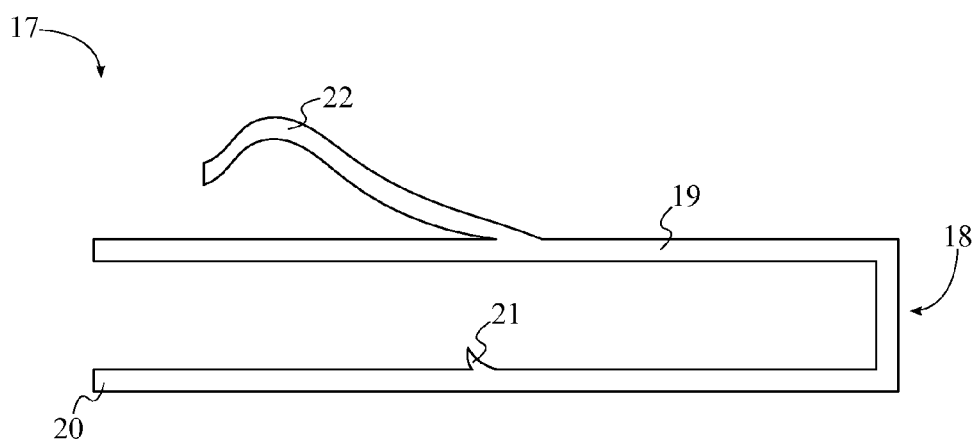
FIG. 13 is a side view of one of the plurality of retaining fasteners.
Figure 14:
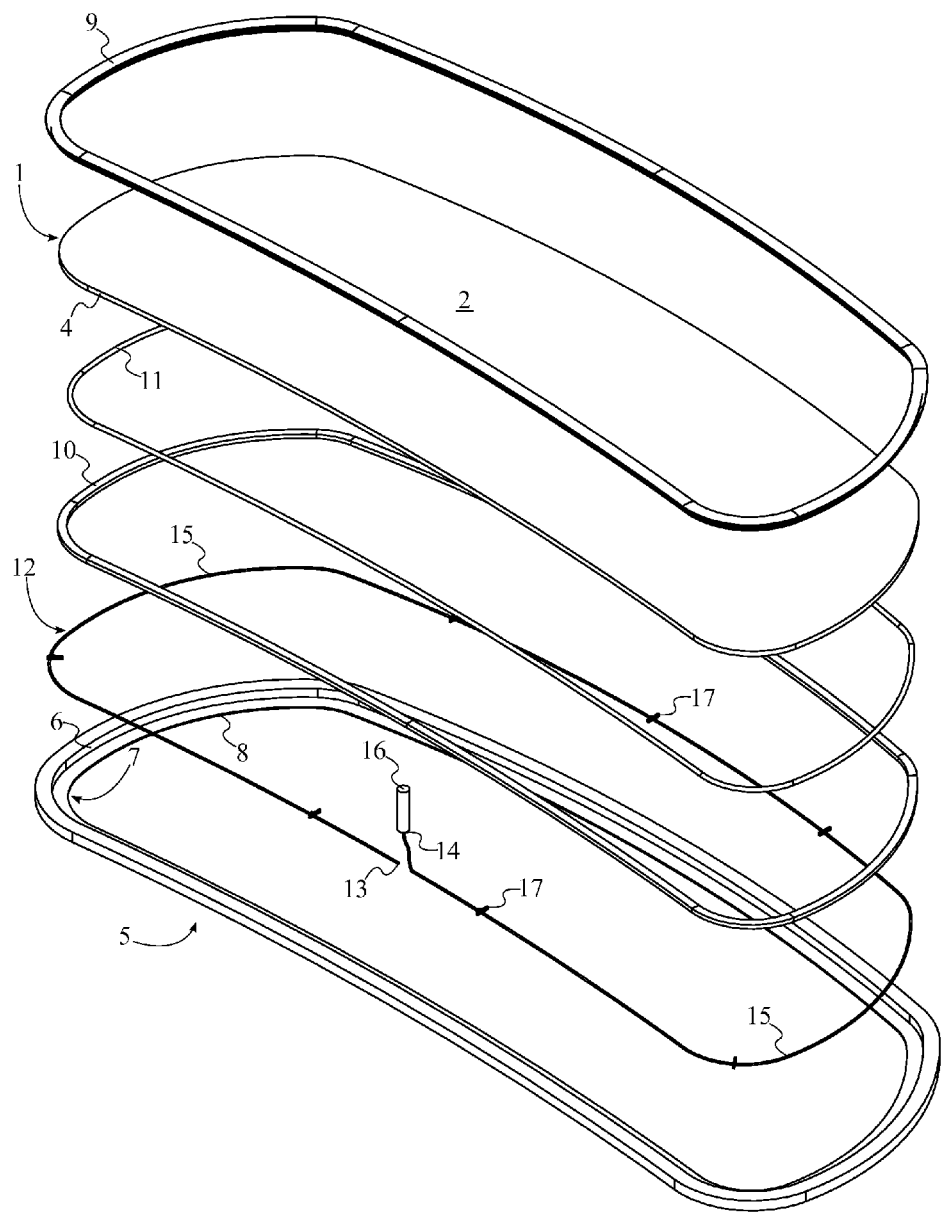
FIG. 14 is an exploded top perspective view of the embodiment of the present invention with the plurality of retaining fasteners.

Again referencing FIGS. 1-6, the release wire 12 is a wire that is utilized to cut through the adhesive 10 securing the windshield panel 1 to the seat rim 7 when the windshield panel 1 must be quickly and safely removed from the windshield frame 5. The release wire 12 comprises a first end 13, an intermediate portion 15, and a second end 14. As shown in FIGS. 7-9, the first end 13 is internally fixed to the windshield frame 5 while the second end 14 is externally located to the windshield frame 5. The second end 14 is free and may be grasped by the user when removing the windshield panel 1 from the windshield frame 5. The intermediate portion 15 is releasably attached to the seat rim 7. When the second end 14 is grasped and pulled, the release wire 12 cuts through the adhesive 10 as the first end 13 is fixed to the windshield frame 5. The intermediate portion 15 is releasably attached to the seat rim 7 around the entire perimeter of the windshield panel 1. Because the release wire 12 is attached to the seat rim 7, the second end 14 is accessible from the vehicle exterior and the user is able to initiate removal of the windshield panel 1 from the vehicle exterior rather than from the vehicle interior. The force provided by the user when pulling the release wire 12 separates the intermediate portion 15 from the seat rim 7 and enables the release wire 12 to cut through the adhesive 10. The release wire 12 is able to cut through the adhesive 10 about the perimeter of the windshield panel 1 and free the windshield panel 1 for removal. When the second end 14 is pulled, the release wire 12 comes into contact with the adhesive 10 and forcibly cuts through the adhesive 10.

The present invention further comprises a leveraging handle 16. The leveraging handle 16 is adjacently connected to the second end 14. As such, the leveraging handle 16 allows the user to more easily grasp the second end 14 when cutting through the adhesive 10. The leveraging handle 16 may be rubberized or otherwise designed to improve the user's grip when cutting through the adhesive 10.

In the embodiment of the present invention shown in FIGS. 10-14, the present invention further comprises a plurality of retaining fasteners 17. The plurality of retaining fasteners 17 are utilized to secure the release wire 12 to the seat rim 7 until the second end 14 is pulled. The plurality of retaining fasteners 17 is evenly distributed along the intermediate portion 15 and as such the plurality of retaining fasteners 17 is able to hold the release wire 12 in place at multiple points along the intermediate portion 15. The intermediate portion 15 is pressed against the seat rim 7 by the plurality of retaining fasteners 17, preventing the release wire 12 from separating from the seat rim 7 until the user wishes to remove the windshield panel 1 from the windshield frame 5. When the second end 14 is pulled, the release wire 12 is freed from the plurality of retaining fasteners 17 and is able to cut through the adhesive 10.

Each of the plurality of retaining fasteners 17 comprises a U-shaped clip 18, a barb 21, and a wire-retaining clip 22. The U-shaped clip 18 is able to attach to the seat rim 7. The U-shaped clip 18 is removably engaged to a free edge 8 of the seat rim 7, allowing the U-shaped clip 18 to separate from the seat rim 7 when the release wire 12 is used to cut through the adhesive 10. The wire-retaining clip 22 holds the release wire 12 in place against the seat rim 7 and is adjacently connected to a first leg 19 of the U-shaped clip 18. As such, the first leg 19 is oriented toward the adhesive 10 and the release wire 12. The intermediate portion 15 is attached onto the seat rim 7 by the wire-retaining clip 22, holding the release wire 12 in place on the seat rim 7 until the windshield panel 1 is removed. The barb 21 assists in holding the U-shaped clip 18 on the seat rim 7 and is connected adjacent to a second leg 20 of the U-shaped clip 18. The barb 21 is thus positioned on the seat rim 7 opposite to the adhesive 10 and the release wire 12. The barb 21 is oriented towards the first leg 19 of the U-shaped clip 18 in order to position the barb 21 towards the seat rim 7. The barb 21 is pressed against the seat rim 7, securely fastening the U-shaped clip 18 to the seat rim 7.

The release wire 12 may be secured to the seat rim 7 via alternative means in lieu of the plurality of retaining fasteners 17. In the embodiment of the present invention shown in FIGS. 4-6, the intermediate portion 15 is adhesively attached to the seat rim 7. The intermediate portion 15 is adhesively held in place on the seat rim 7 until the second end 14 is pulled and the release wire 12 begins cutting through the adhesive 10.

Figure 15:
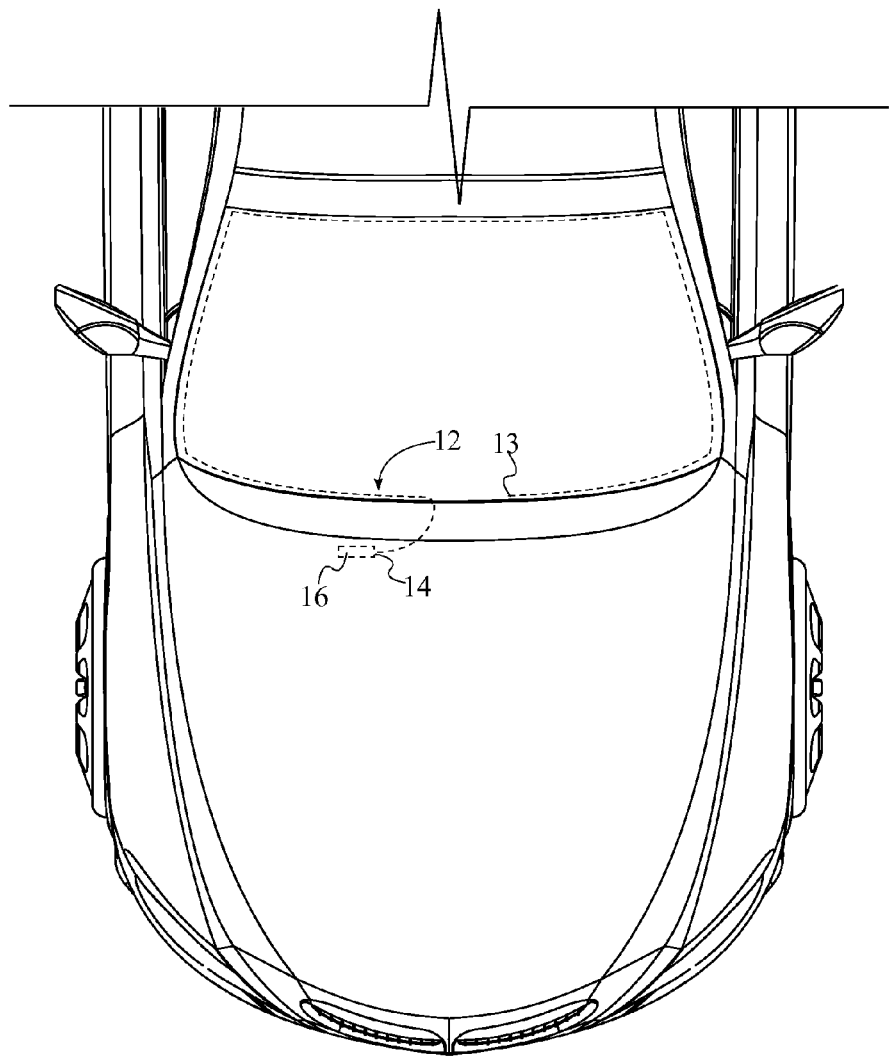
FIG. 15 is a top view of a vehicle showing the positioning of the second end of the release wire when not in use.

When the present invention is not in use, the second end 14 is positioned under a vehicle cowl as shown in FIG. 15. This places the second end 14 out of view and out of reach until the windshield panel 1 must be removed. Additionally, positioning the second end 14 under the vehicle cowl prevents unintentional use of the present invention.

Again referring to FIGS. 1-14, in order to remove the windshield panel 1 from the windshield frame 5 using the present invention, the molding 9 is first removed from in between the lateral surface 4 and the lateral brace 6. The second end 14 is then retrieved and pulled. If the plurality of retaining fasteners 17 is in use to hold the release wire 12 against the seat rim 7, the release wire 12 is pulled in a clockwise direction. This frees the release wire 12 from underneath the wire-retaining clip 22 and directs the release wire 12 toward the adhesive 10. The release wire 12 is then able to cut through the adhesive 10 as the release wire 12 is pulled further. If the release wire 12 is adhesively held in place on the seat rim 7, the release wire 12 is pulled toward the free edge 8, enabling the release wire 12 to cut through the adhesive 10. Once the release wire 12 has cut through the adhesive 10 about the perimeter of the windshield panel 1, the windshield panel 1 is freed from the windshield frame 5 and may be removed.

Although the present invention has been explained in relation to its preferred embodiment, it is understood that many other possible modifications and variations can be made without departing from the spirit and scope of the present invention as hereinafter claimed.

What is claimed is:

1. A quick-release windshield system comprises:
   a windshield panel;
   a windshield frame;
   a molding;
   an adhesive;
   a sealer;
   a release wire;
   the windshield panel comprises an exterior surface, an interior surface, and a lateral surface;
   a cross-section of the windshield frame comprises a lateral brace and a seat rim;
   the release wire comprises a first end, an intermediate portion, and a second end;
   the seat rim being positioned perpendicular to the lateral brace;
   the interior surface being perimetrically adhered to the seat rim by the adhesive;
   the lateral surface being hermetically connected to the lateral brace by the molding;
   the sealer being pressed against the interior surface by the seat rim;
   the adhesive being positioned in between the molding and the sealer;
   the first end being internally fixed to the windshield frame;

the intermediate portion being releasably attached to the seat rim;

the second end being externally located to the windshield frame.

2. The quick-release windshield system as claimed in claim 1 further comprises:
a leveraging handle;
the leveraging handle being adjacently connected to the second end.

3. The quick-release windshield system as claimed in claim 1 further comprises:
a plurality of retaining fasteners;
the plurality of retaining fasteners being evenly distributed along the intermediate portion;
the intermediate portion being pressed against the seat rim by the plurality of retaining fasteners.

4. The quick-release windshield system as claimed in claim 3 further comprises:
each of the plurality of retaining fasteners comprises a U-shaped clip, a barb, and a wire-retaining clip;
the wire-retaining clip being adjacently connected to a first leg of the U-shaped clip;
the U-shaped clip being removably engaged to a free edge of the seat rim;
the intermediate portion being attached onto the seat rim by the wire-retaining.

5. The quick-release windshield system as claimed in claim 3 further comprises:
each of the plurality of retaining fasteners comprises a U-shaped clip and a barb;
the U-shaped clip being removably engaged to a free edge of the seat rim;
the barb being connected adjacent to a second leg of the U-shaped clip;
the barb being oriented towards a first leg of the U-shaped clip;
the barb being pressed against the seat rim.

6. The quick-release windshield system as claimed in claim 1 further comprises:
the intermediate portion being adhesively attached to the seat rim.

7. The quick-release windshield system as claimed in claim 1, wherein the second end is positioned under a vehicle cowl.

8. The quick-release windshield system as claimed in claim 1, wherein the seat rim is a pinchweld.

9. The quick-release windshield system as claimed in claim 1, wherein the adhesive is a urethane adhesive.

10. A quick-release windshield system comprises:
a windshield panel;
a windshield frame;
a molding;
an adhesive;
a sealer;
a release wire;
a plurality of retaining fasteners;
the windshield panel comprises an exterior surface, an interior surface, and a lateral surface;
a cross-section of the windshield frame comprises a lateral brace and a seat rim;
the release wire comprises a first end, an intermediate portion, and a second end;
the seat rim being positioned perpendicular to the lateral brace;
the interior surface being perimetrically adhered to the seat rim by the adhesive;
the lateral surface being hermetically connected to the lateral brace by the molding;
the sealer being pressed against the interior surface by the seat rim;
the adhesive being positioned in between the molding and the sealer;
the first end being internally fixed to the windshield frame;
the intermediate portion being releasably attached to the seat rim;
the second end being externally located to the windshield frame;
the plurality of retaining fasteners being evenly distributed along the intermediate portion;
the intermediate portion being pressed against the seat rim by the plurality of retaining fasteners.

11. The quick-release windshield system as claimed in claim 10 further comprises:
a leveraging handle;
the leveraging handle being adjacently connected to the second end.

12. The quick-release windshield system as claimed in claim 10 further comprises:
each of the plurality of retaining fasteners comprises a U-shaped clip, a barb, and a wire-retaining clip;
the wire-retaining clip being adjacently connected to a first leg of the U-shaped clip;
the U-shaped clip being removably engaged to a free edge of the seat rim;
the intermediate portion being attached onto the seat rim by the wire-retaining.

13. The quick-release windshield system as claimed in claim 10 further comprises:
each of the plurality of retaining fasteners comprises a U-shaped clip and a barb;
the U-shaped clip being removably engaged to a free edge of the seat rim;
the barb being connected adjacent to a second leg of the U-shaped clip;
the barb being oriented towards a first leg of the U-shaped clip;
the barb being pressed against the seat rim.

14. The quick-release windshield system as claimed in claim 1, wherein the second end is positioned under a vehicle cowl.

15. The quick-release windshield system as claimed in claim 1, wherein the seat rim is a pinchweld.

16. The quick-release windshield system as claimed in claim 1, wherein the adhesive is a urethane adhesive.

* * * * *